US010210712B2

(12) United States Patent
Nakamura

(10) Patent No.: US 10,210,712 B2
(45) Date of Patent: Feb. 19, 2019

(54) GAMING MACHINE, GAMING METHOD, AND RECORDING MEDIUM FOR PROVIDING GUARANTEED SPECIAL EVENTS

(71) Applicant: Konami Gaming, Incorporated, Las Vegas, NV (US)

(72) Inventor: Daisuke Nakamura, Zama (JP)

(73) Assignee: Konami Gaming, Incorporated, Las Vegas, NV (US)

( * ) Notice: Subject to any disclaimer, the term of this patent is extended or adjusted under 35 U.S.C. 154(b) by 199 days.

(21) Appl. No.: 15/120,497

(22) PCT Filed: Feb. 20, 2015

(86) PCT No.: PCT/JP2015/054811
§ 371 (c)(1),
(2) Date: Aug. 19, 2016

(87) PCT Pub. No.: WO2015/125924
PCT Pub. Date: Aug. 27, 2015

(65) Prior Publication Data

US 2017/0018143 A1 Jan. 19, 2017

(30) Foreign Application Priority Data

Feb. 20, 2014 (JP) ................................ 2014-031000

(51) Int. Cl.
*A63F 13/00* (2014.01)
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3244* (2013.01); *G07F 17/34* (2013.01)

(58) Field of Classification Search
CPC .. G07F 17/34; G07F 17/3213; G07F 17/3267; G07F 17/3244; G07F 17/326
See application file for complete search history.

(56) References Cited

U.S. PATENT DOCUMENTS

2005/0049030 A1* 3/2005 Tachikawa .............. G07F 17/32 463/20
2006/0183530 A1 8/2006 Ellis
(Continued)

FOREIGN PATENT DOCUMENTS

JP 2006-061294 A 3/2006
JP 2006-305046 A 11/2006
(Continued)

OTHER PUBLICATIONS

International Preliminary Report on Patentability and Written Opinion (PCT/JP2015/054811); dated Sep. 1, 2016.
(Continued)

*Primary Examiner* — Justin Myhr
(74) *Attorney, Agent, or Firm* — Howard & Howard Attorneys PLLC

(57) ABSTRACT

A gaming machine providing a player with a game includes: a display unit configured to display the game; and a controller configured to determine contents of the game to be displayed on the display unit. The controller executes a predetermined number of special games when a first condition is satisfied during execution of a normal game, and applies a special event when a second condition is satisfied during execution of the normal game or execution of the special games. The controller applies the special event at least once in the predetermined number of the special games regardless of the second condition.

17 Claims, 8 Drawing Sheets

(56) References Cited

U.S. PATENT DOCUMENTS

| | | | | |
|---|---|---|---|---|
| 2008/0318663 | A1* | 12/2008 | Yokota ................ | G07F 17/3244 463/20 |
| 2009/0233691 | A1* | 9/2009 | Yoshizawa ............. | G07F 17/32 463/20 |
| 2010/0240438 | A1 | 9/2010 | DePalma | |
| 2010/0298041 | A1 | 11/2010 | Berman et al. | |
| 2014/0256402 | A1* | 9/2014 | Caputo .................. | G07F 17/34 463/20 |

FOREIGN PATENT DOCUMENTS

| | | | |
|---|---|---|---|
| JP | 2007-195739 | A | 8/2007 |
| JP | 2013-248463 | A | 12/2013 |
| WO | 2007/026407 | A1 | 3/2007 |

OTHER PUBLICATIONS

International Search Report (PCT/JP2015/054811); dated May 26, 2015.

* cited by examiner (a)

(b)

(c)

GAMING MACHINE, GAMING METHOD, AND RECORDING MEDIUM FOR PROVIDING GUARANTEED SPECIAL EVENTS

CROSS REFERENCE TO RELATED APPLICATION

This application is a national stage application of PCT/JP2015/054811, filed Feb. 20, 2015, which claims priority to Japanese Patent Application No. 2014-031000, filed Feb. 20, 2014, the disclosures of which are hereby incorporated by reference in their entirety.

TECHNICAL FIELD

The present invention relates to a gaming machine, a gaming method, and a recording medium.

BACKGROUND ART

Patent Literature 1 discloses a slot machine as a gaming machine. The slot machine spin-displays reels including a plurality of symbols and thereafter stop-displays the reels to determine whether or not a win is acquired as a function of arrangement of the symbols that are stop-displayed. Also, the slot machine applies a special event to provide the player with an opportunity to win a high-priced prize, when a trigger condition is satisfied. The special event includes, for example, re-spinning some of the reels after stop-displaying, replacing some of the stop-displayed symbols with wild symbols, and the like. The slot machine applies a special event regardless of the trigger condition, when a predetermined number of games with no special event continue, to secure the frequency of the special event with a fixed value or more being applied.

CITATION LIST

Patent Literature

Patent Literature 1: US Patent Application Publication No. 2006/0183530

SUMMARY OF INVENTION

Technical Problem

Among games provided by the gaming machine, for example, in addition to the normal game which spin-displays and stop-displays reels by consuming the credit, there is also a special game which provides more advantageous condition than the normal game. Examples of the special game include free games that provide a predetermined number of games that are the same as the normal game without consumption of the credit, games that provide a plurality of games that are the same as the normal game in a mode with higher prize-winning probability or higher dividend rate and the like. Setting the prize-winning probability or the dividend rate in a free game higher than that of the normal game is also widely performed. When a rule with which a special event may be applied also in the normal game is adopted, the player expects the special event to be also applied in the special game to win a high-priced prize.

However, as the gaming machine disclosed in Patent Literature 1, even when the timing to apply the special event is controlled based on the number of games, there are cases where the number of games does not satisfy a condition during the special game and no special event is applied. Thus when no special event is applied during the special game, the player may feel that an opportunity to acquire a large-amount dividend was lost even though the player could have acquired the special game. In the present field of art, there is demand for a gaming machine, a gaming method, and a recording medium that suppresses reductions in player satisfaction as described above.

Solution to Problem

A gaming machine according to an aspect of the present invention is a gaming machine providing a player with a game, comprising: a display unit configured to display the game; and a controller configured to determine contents of the game to be displayed on the display unit. The controller is configured to execute a predetermined number of special games when a first condition is satisfied during execution of a normal game, and apply a special event when a second condition is satisfied during execution of the normal game or execution of the special games. The controller is also configured to apply the special event at least once in the predetermined number of the special games regardless of the second condition.

According to this gaming machine, it applies a special event at least once in a predetermined number of special games. For this reason, the gaming machine averts the player from feeling that an opportunity to acquire a large-amount dividend was lost. Accordingly, the gaming machine can suppress reductions in player satisfaction.

In one embodiment, the controller may determine at least one special game among the predetermined number of the special games by lottery drawing when the first condition is satisfied, and the special event is applied to the at least one special game. In this case, because the timing to apply the special event is not uniform, the special event can be applied at a timing that is unexpected to the player.

In one embodiment, the controller may start providing the predetermined number of the special games after determining the at least one special game to which the special event is to be applied. In this case, the special event can be securely applied when the at least one special game is being executed.

In one embodiment, the gaming machine may include a plurality of reels and each reel including a plurality of symbols; the controller may provide the game and the special games that judge a win when predetermined symbols are arranged in an effective line in the game and the special games; and the special event may be an event to change at least one symbol in the plurality of reels to a wild symbol. In this case, a special event that provides a situation advantageous to the player can be applied when the special game is being executed in the slot machine that performs line determination.

In one embodiment, the gaming machine may include a plurality of reels and each reel including a plurality of symbols; the controller may provide the game and the special games that award a prize when a predetermined number of specific symbols exist in a determination region; and the special event may be an event to change at least one symbol in the plurality of reels to the specific symbol. In this case, a special event that provides a situation advantageous to the player can be applied when the special game is being executed in the slot machine that performs a so-called scatter determination.

In one embodiment, the gaming machine may include a plurality of reels and each reel including a plurality of symbols; the controller may provide the game and the special games that provide a dividend when a win is judged; and the special event may be an event to change at least one symbol in the plurality of reels to a high-dividend symbol. In this case, a special event that provides a situation advantageous to the player can be applied when the special game is being executed in the slot machine.

In one embodiment, the gaming machine may include a plurality of reels and each reel including a plurality of symbols; the controller may provide the game and the special games that provide a dividend when a win is judged; and the special event may be an event to change at least one symbol in the plurality of reels to a multiplier symbol to multiply the dividend by a predetermined number. In this case, a special event that provides a situation advantageous to the player can be applied when the special game is being executed in the slot machine.

In one embodiment, at least either one of a prize-winning rate or a dividend rate in each of the special games may be higher than that of the normal game. In one embodiment, the special games may be a free game that is provided without credit consumption.

A gaming method according to another aspect of the present invention is a gaming method for displaying a game provided to a player by a display unit and determining contents of the game to be displayed on the display unit by a controller. The method includes: a step of executing a predetermined number of special games when a first condition is satisfied during execution of a normal game; a step of applying a special event when a second condition is satisfied during execution of the normal game or execution of the special games; and a step of applying the special event at least once in the predetermined number of the special games regardless of the second condition, performed by the controller.

The gaming method applies the special event at least once in a predetermined number of special games. For this reason, the gaming method prevents the player from feeling that the player has lost an opportunity to acquire a large-amount dividend. Accordingly, the gaming method can suppress reductions in player satisfaction.

A recording medium according to another aspect of the present invention is a computer-readable recording medium recording a program to cause one or a plurality of computers to implement a function of providing a player with games. The program causes the one or plurality of computers to function as a controller determining contents of a game to be displayed on a display unit. The controller is configured to execute a predetermined number of special games when a first condition is satisfied during execution of a normal game, apply a special event when a second condition is satisfied during execution of the normal game or execution of the special games, and apply the special event at least once in the predetermined number of special games regardless of the second condition.

With the recording medium, the special event is applied at least once in a predetermined number of special games. The recording medium prevents the player from feeling that the player has lost an opportunity to acquire a large-amount dividend. Accordingly, the recording medium can suppress reductions in player satisfaction.

Advantageous Effects of Invention

The invention provides a gaming machine, a gaming method, and a recording medium that can suppress reductions in player satisfaction.

DESCRIPTION OF EMBODIMENTS

Figure 1:
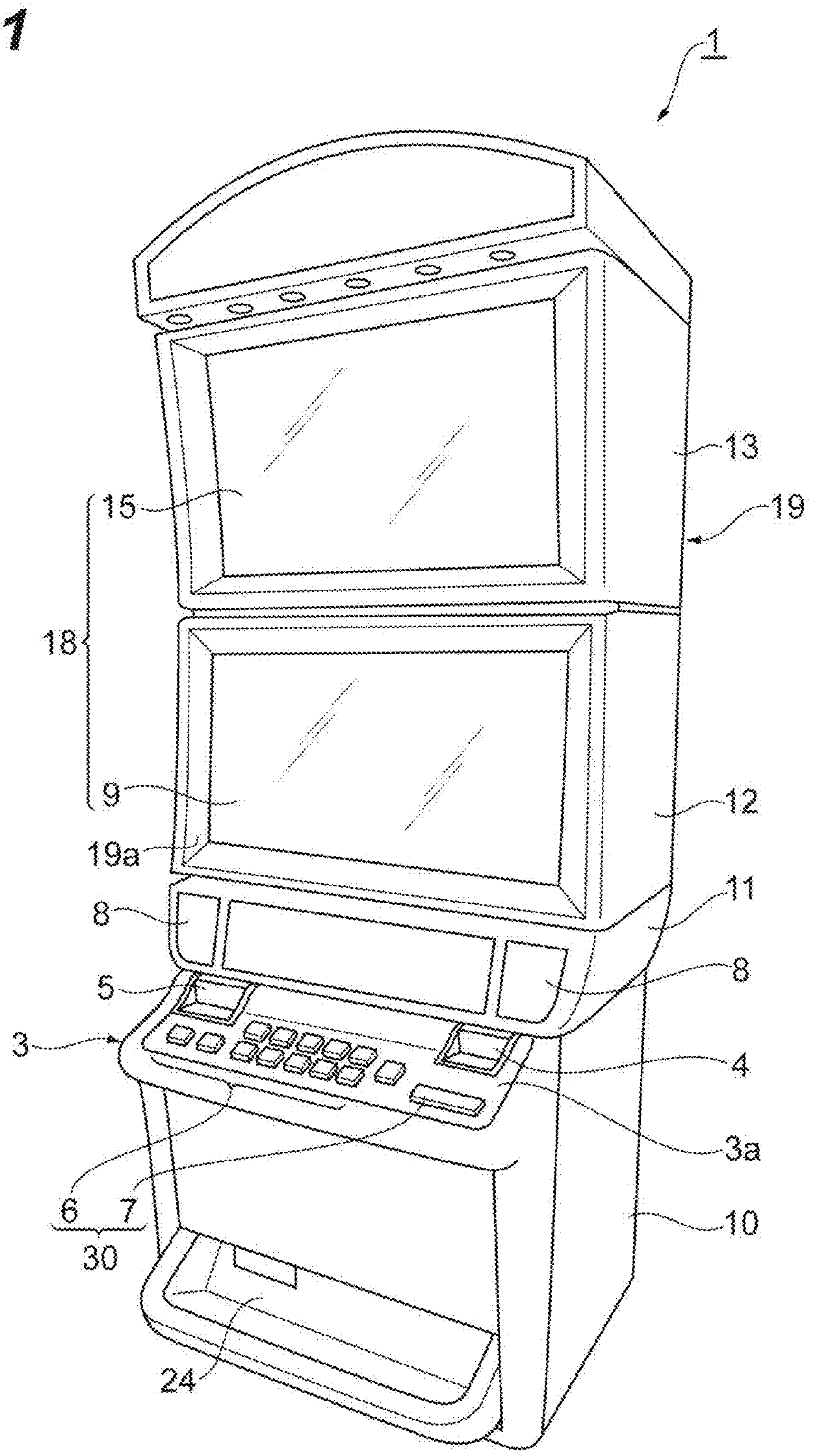
FIG. 1 is a perspective view of a gaming machine according to an embodiment.

The following is an explanation of an embodiment of the present invention with reference to attached drawings. In the drawings, the identical or corresponding elements are denoted by the same reference numeral, and repeated explanation will be omitted.

A gaming machine 1 according to the present embodiment is a machine that provides a game in compensation for a wager and provides an award such as a dividend according to a game result, such as a slot machine, a poker machine, a keno machine, a bingo machine, a pachinko machine, and a pachinko-slot machine, which provides the player with games in casinos. Examples of the wager include tangibles such as metallic currency, bills, coins, medals, and tickets, or concepts including electric data with values equivalent to the tangibles. When the wager as described above is deposited into the gaming machine 1, the wager is converted into a number of credit serving as a consumption unit and accumulated to be used to provide the player with a game by consuming the accumulated credit. The following explanation illustrates an example of the case where the gaming machine 1 is a slot machine that includes reels, each of the reels includes a plurality of symbols, spins and thereafter stops the reels, and determines whether or not a win is acquired in accordance with the symbols that are displayed when the reels are stopped.

FIG. 1 is a perspective view of the gaming machine 1 according to the embodiment. As illustrated in FIG. 1, the gaming machine 1 includes a vertical housing 19 extending in the vertical direction. A front surface 19*a* of the housing 19 is provided with a display unit (display unit) 18. The display unit 18 has a function of displaying contents of the game. The display unit 18 includes a lower display device 9 and an upper display device 15.

The lower display device 9 and the upper display device 15 display graphics or images relating to the contents of the game. The lower display device 9 is provided in a box 12. An upper box 13 is provided above the box 12. A front surface of the upper box 13 is provided with the upper display device 15 described above.

A control panel 3 is provided under the display unit 18. The control panel 3 is provided in a bottom cabinet 10 provided under the box 12. A surface 3*a* of the control panel 3 is provided with an inserting port 4, an output port 5, and an operating unit 30. The inserting port 4 receives a wager that is deposited by the player as a compensation for execution of the game. Coins or bills are used as the wager for this example. A voucher ticket, which is a medium with printed information of the credit accumulated in the gaming machine 1, is outputted from the output port 5 in response to an operation of a payout button described later. The inserting port 4 or the output port 5 may further be configured to be capable of reading credit information printed on the medium. In this case, the gaming machine 1 may have a structure of accumulating credit in the gaming machine 1 based on the read credit information.

The operating unit 30 receives various instructions from a player for the gaming machine 1. The operating unit 30 includes, for example, a spin button 7 and a plurality of buttons 6. The spin button 7 receives an instruction to start the game (to start spin of the reels). The buttons 6 includes, for example, a bet button group, a line designating button group, a max bet button, and/or a payout button The bet button group receives an operation to designate the credit by a predetermine unit amount that is bet by the player. The line designating button group receives an operation to issue an instruction to designate the line (hereinafter referred to as "effective line") to be designated as a target for a win determination. The max bet button receives an operation to issue an instruction to bet the maximum credit that can be bet at one time. The payout button receives an operation to issue an instruction to pay out. A payout tray 24 is provided to pay out the wager under the control panel 3. The payout tray 24 is provided in the bottom cabinet 10. When the payout button is operated, the gaming machine 1 may output information of the accumulated credit from the output port 5 or payout the wager from the payout tray 24, and either of which is selected according to the setting of the gaming machine 1. The gaming machine 1 may be configured to select one of them in accordance with the player's designation.

A lower box 11 is disposed between the box 12 and the bottom cabinet 10. A front surface of the lower box 11 is provided with a plurality of speakers 8. The plurality of speakers 8 may output sound, for example, in accordance with progress of the game. The speakers 8 may also output sound even when the gaming machine 1 is not providing a game.

Figure 2:
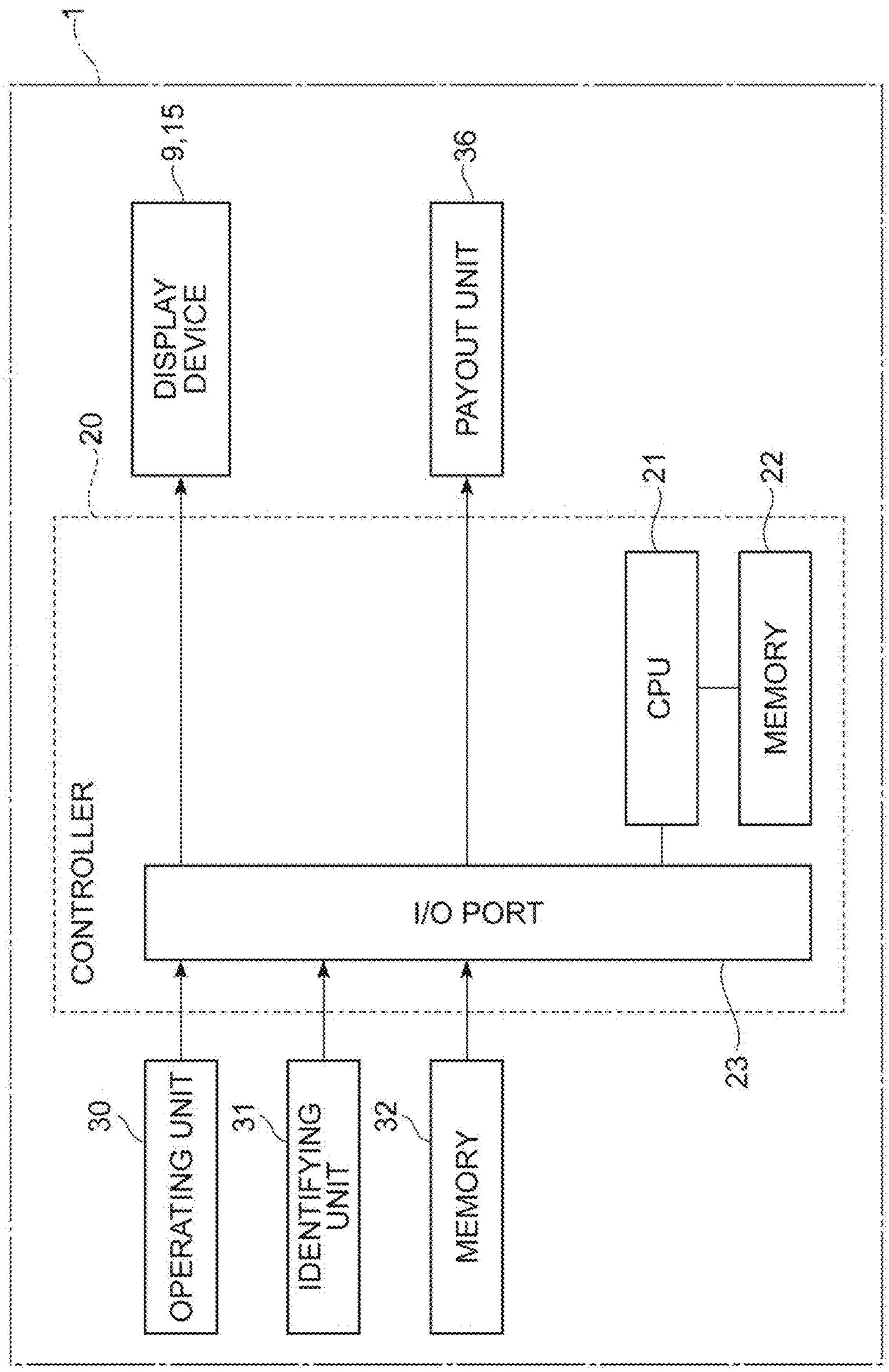
FIG. 2 is a block diagram of a control system in the gaming machine in FIG. 1.

FIG. 2 illustrates an outline of a control system in the gaming machine 1. The gaming machine 1 includes a controller 20. The controller 20 is configured as a computer unit including a central processing unit (hereinafter abbreviated to "CPU") 21, and a memory 22 which can be referred by the CPU 21. The memory 22 may include a magnetic or optical storage medium, or a nonvolatile storage medium such as an EEPROM. The memory 22 records a game program necessary for execution of a game and game data to be referred to by the game program. The CPU 21 reads and executes the game program to determine the contents of the game, and progresses the slot game in a predetermined procedure. Such controller 20 as described above may be configured to be stored in, for example, the bottom cabinet 10 of the housing 19. The controller may be separated from the housing 19, and provided on a network such as a local area network (LAN) or a wide area network (WAN). The following explains operations of the controller 20 as operations of the CPU 21.

The CPU 21 is connected with the operating unit 30 and an identifying unit 31 via an input/output (I/O) port 23. The operating unit 30 receives a player's instruction and outputs a signal corresponding to the player's instruction to the CPU 21. The identifying unit 31 identifies the wager (such as coins, bills, or tickets, and the like) inserted from the inserting port 4 and outputs a signal corresponding to the identified amount to the CPU 21.

The CPU 21 determines the contents of the game based on the player's instruction and the bet credit or the like. The CPU 21 is also connected with the lower display device 9, the upper display device 15, the reels 2, and a payout unit 36 via the I/O port 23. The CPU 21 operates at least one of the lower display device 9 and the upper display device 15 in accordance with the determined contents of the game to display the contents of the game in the display area. The mentioned-display area is a display panel portion of the lower display device 9 or the upper display device 15. The CPU 21 performs controlling virtual reels spins, described later, in accordance with the determined game contents. The CPU 21 causes the payout unit 36 to manage payout of the wager to the payout tray 24 and causes the output port 5 to manage printing and outputting information of the accumulated credit on a medium. The controller 20 is also properly connected with other devices necessary for execution of the slot game, but illustrations of the other devices are omitted.

Figure 3:
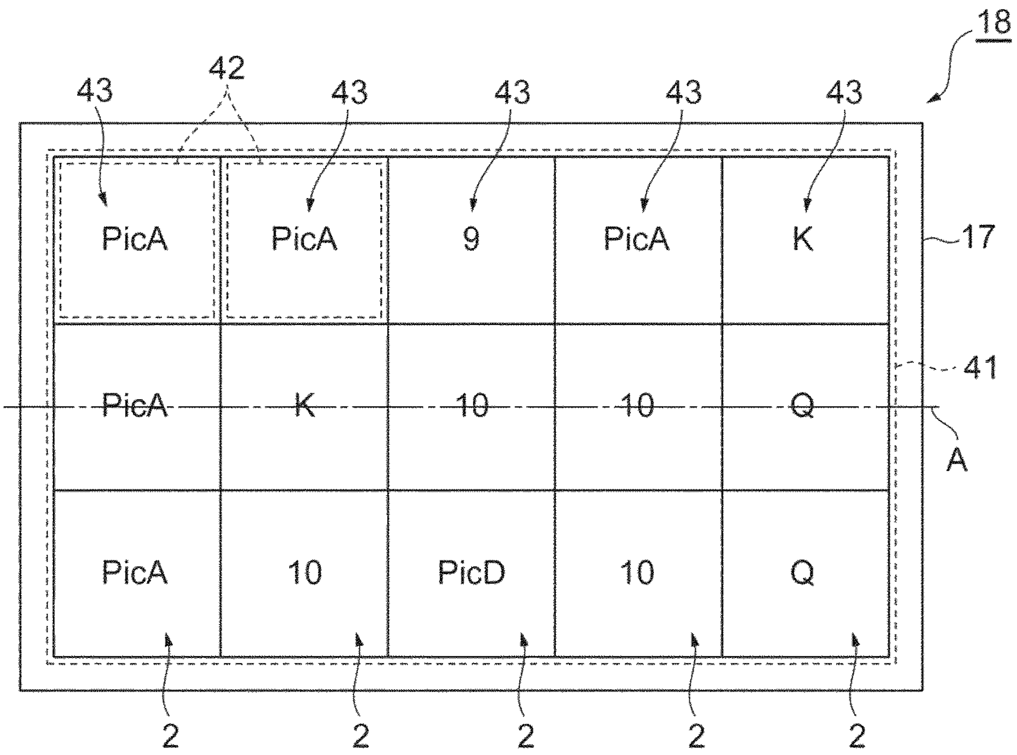
FIG. 3 illustrates an example of a symbol region.

FIG. 3 illustrates an example of a slot game display displayed on the display unit 18 in accordance with the control of the CPU 21. As illustrated in FIG. 3, a game display 40 is displayed in a display area 17. A plurality of reels 2 are displayed in the game display 40. The reels 2 are video reels that are virtually configured with a plurality of symbols arranged therein, wherein the symbols are selected from, for example, "9", "10", "J", "Q", "K", "A", "Pic-A", "Pic-B", "Pic-C", "Pic-D", and "Pic-E". The game display 40 is provided with a symbol region 41 to display the symbols of the reels 2. In this example, in the symbol region 41, a plurality of cells 42 serving as symbol stop positions are defined to form a matrix including three rows in the vertical direction and five columns in the horizontal direction. In the following explanation, the horizontal direction of the game display 40 may be referred to as row direction, and the vertical direction may be referred to as column direction. In the symbol region 41, the symbols of the reels 2 are displayed to move (scroll) in the column direction in a predetermined spin period and the scroll of the symbols are stopped and displayed in the predetermined stop period. Borderlines of the cells 42 may be displayed such that they can be visually recognized by the player on the display unit 18 or display thereof may be omitted. In other words, it is suffice if the cells 42 are logically or conceptually defined as symbol stop positions inside the gaming machine 1 and borderlines of the cells 42 are not necessarily to be visually recognizable.

The effective line is a line that designates a plurality of cells 42 to be serve as targets of a win determination in the slot game and is set to extend over the reels 2. The effective line may be properly set by the player operating the line designating button group of the operating unit 30, or the effective line may be properly set by operating the bet button. An example of the effective line that can be set is a horizontal line A that connects all the cells 42 located in the vertical center of the symbol region 41. Some other examples are the effective line being set to a line extending in a diagonal direction of the symbol region 41, or a line having a V shape or an inverted V shape in the symbol region 41. When the player operates the bet button group to designate the number of units to be bet in a slot game and selects the effective line with the line designating button group, the CPU 21 recognizes those selection contents. Thereafter, when the player operates the spin button 7, the CPU 21 moves (scrolls) each of the symbols 43 to the column direction in the symbol region 41 to stop the scroll of the symbols 43 in a predetermined stop period such that one symbol 43 appears in one cell 42. When the symbols 43 are stopped, a winning pattern is formed when the designs of the symbols 43 displayed in the cells 42 on the effective line match or forming a predetermined relation. In the following explanation, a win determination using the effective line is referred to as line determination.

Further, a determination method other than the line determination described above may be adopted. For example, a part or the whole of the symbol region 41 may be designated as a determination region to determine acquisition of a win when a predetermined number of specific symbols exist in the determination region. As another example, acquisition of a win may be also determined when specific symbols are successively displayed in a predetermined number of successive reels from the reels of the left to the right ends in the symbol region 41. Such a win determination is referred to as a scatter determination in the following explanation.

The symbols 43 are predetermined as virtual reel strips serving as symbol arrangements that are virtually configured to correspond to the respective reels 2, and recorded in the memory 22 as a part of the game data. The CPU 21 refers to the data recorded in the memory 22 to control display of the reels 2 in the game display 40. The data stored in the memory 22 may be stored in a memory 32 that is readable by the controller 20.

Figure 4:
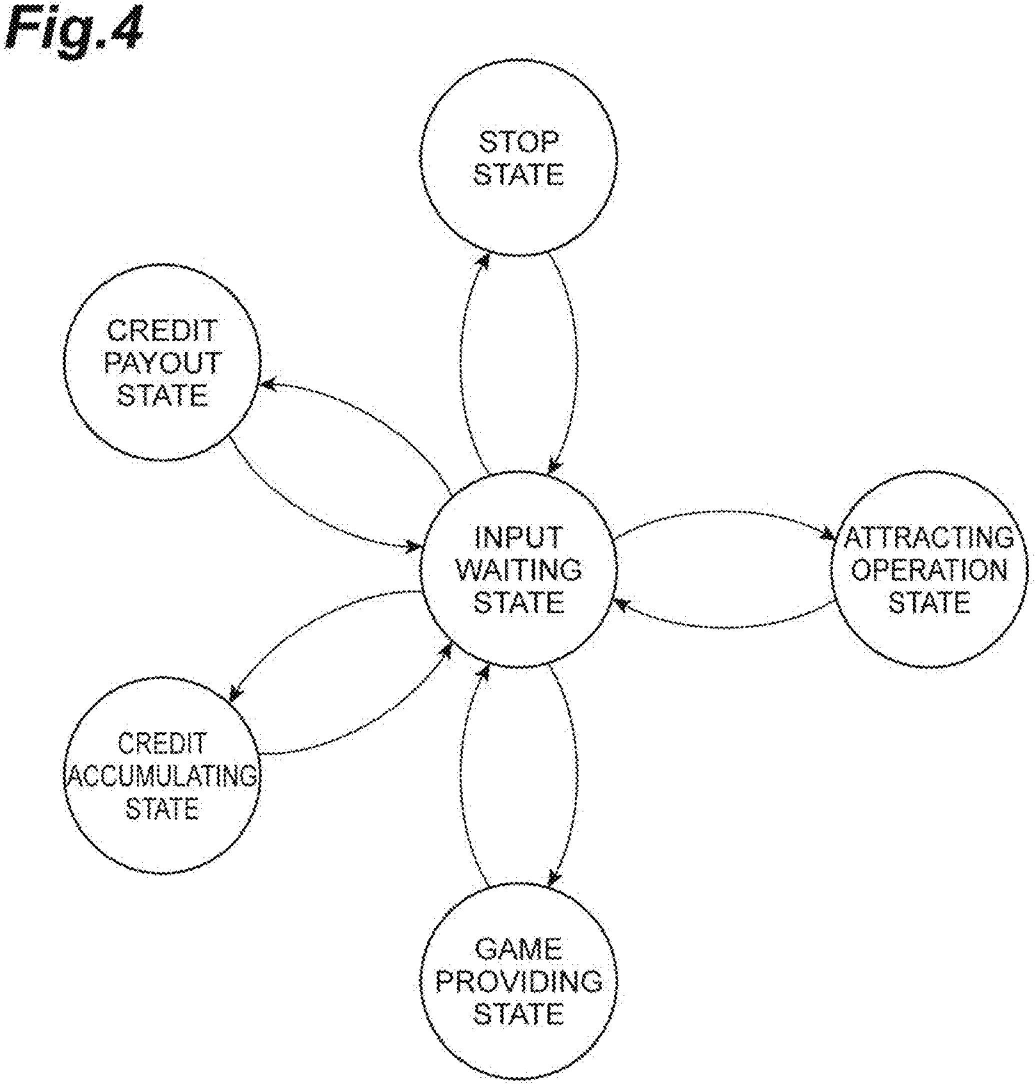
FIG. 4 is a state transition diagram of the gaming machine of FIG. 1.

The following is an explanation of operations of the gaming machine 11 according to the present embodiment, with reference to FIG. 4. FIG. 4 is a state transition diagram of the gaming machine 1 configured as described above according to the present embodiment. As illustrated in FIG. 4, the gaming machine 1 changes to the states including a stop state, an input waiting state, a credit payout state, a credit accumulating state, an attracting operation state, and a game providing state. The following is an explanation of these states.

The stop state indicates that the gaming machine 1 is not being activated. The gaming machine 1 in the stop state is activated and initialized when a certain activating operation is received, a predetermined program is executed by the controller 20 and a game display is displayed on the display unit 18, and then the gaming machine 1 changes its state to the input waiting state.

As for the gaming machine 1 in the input waiting state, when a bill/ticket identifying unit 55 identifies a bill or a ticket, the gaming machine 1 changes to the credit accumulating state to accumulate corresponding credit information in the gaming machine 1, and returns to the input waiting state when accumulation of the credit ends. When the gaming machine 1 in the input waiting state receives an operation of the payout button in a state where credit information is accumulated, the gaming machine 1 changes its state to the credit payout state to perform a payout process of the accumulated credit and output a ticket including printed information corresponding to the credit payout processing from a printer unit 56, and reset the credit accumulated in the gaming machine 1 to zero. The gaming machine 1 that has finished the processing returns to the input waiting state.

When the gaming machine 1 in the input waiting state is not operated for a predetermined time, the state changes to the attracting operation state to display an attraction display on the display unit 18. When the gaming machine 1 in the attracting operation state receives some operation, it returns to the input waiting state. The attraction display is a display to appeal to customers in the casino for the existence of the gaming machine 1, and consist of predetermined images and/or animations.

The gaming machine 1 in the input waiting state sets the number of lines and the number of bets of the game by receiving an operation of the line selection button, the bet number selection button, or the max bet button in a state where the credit is accumulated inside and receive an operation of the start button to reduce the credit amount by the amount obtained by multiplying the set number of lines and the credit amount and change to the game providing state. In the game providing state, the gaming machine 1 provides a game in accordance with the flowcharts illustrated in FIG. 5 and FIG. 8. The gaming machine 1 may also change to the game providing state in response to an operation of the bet number selection button or the max bet button.

Figure 5:
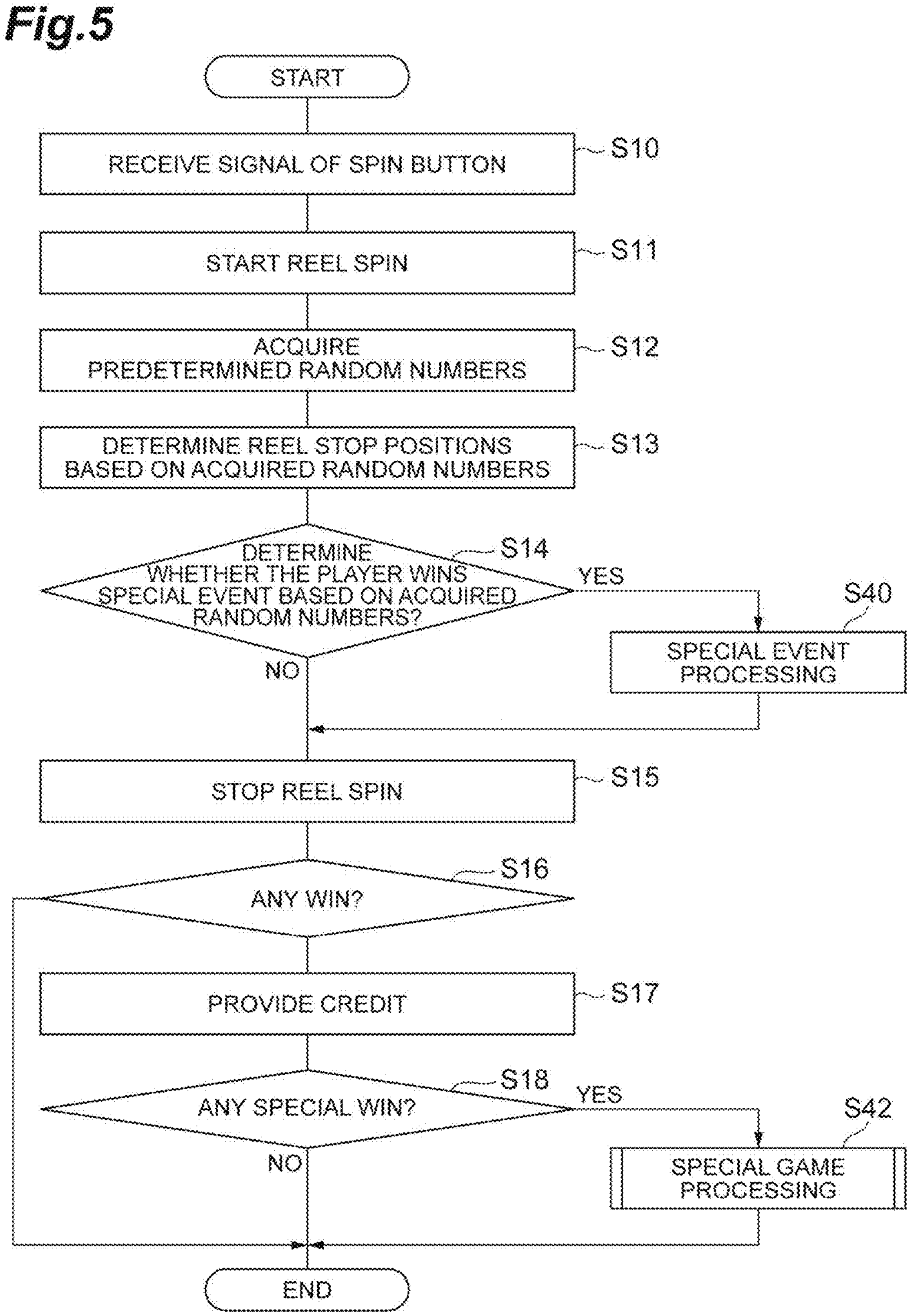
FIG. 5 is a flowchart illustrating operations in a normal game of the gaming machine of FIG. 1.
Figure 8:
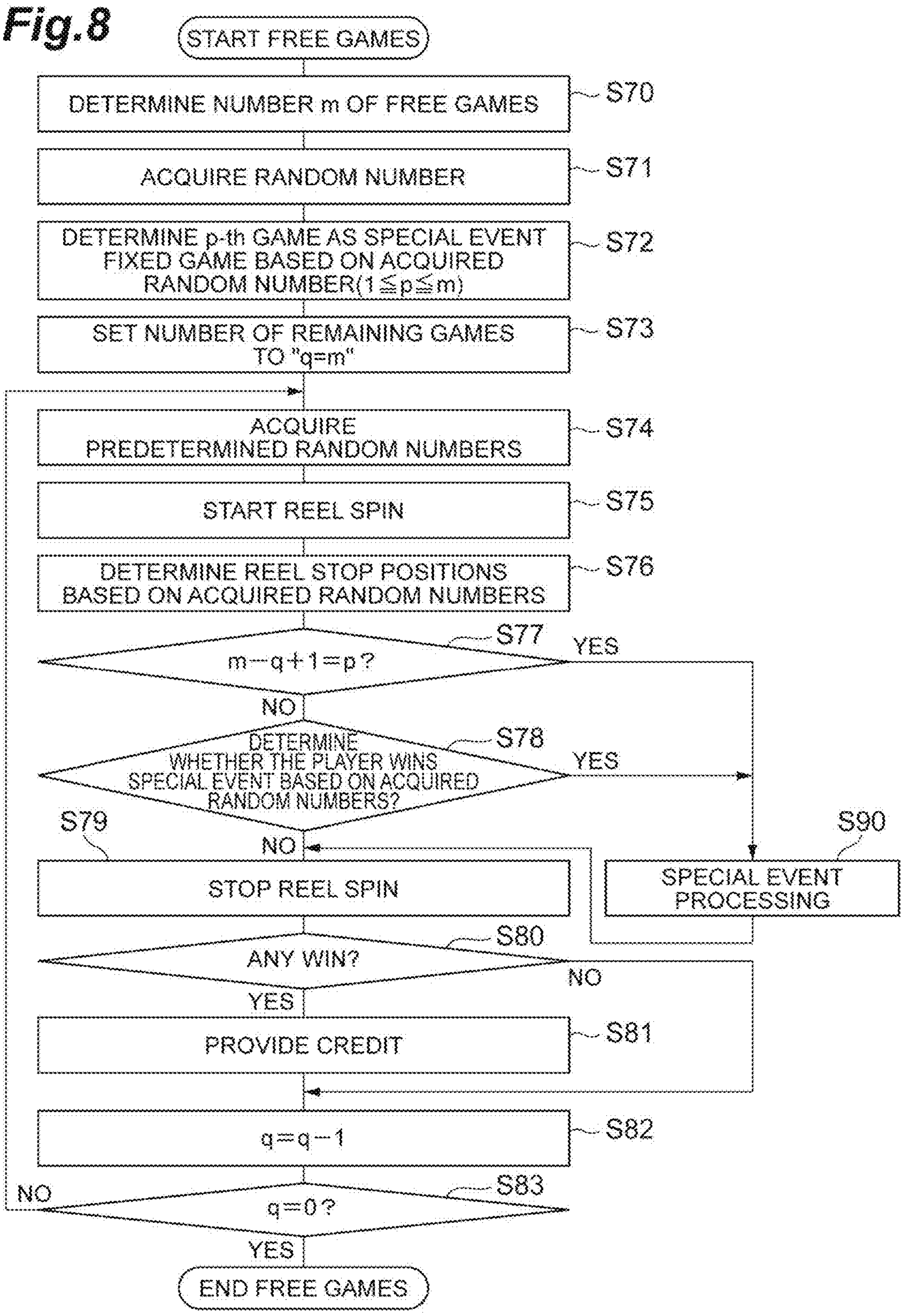
FIG. 8 is a flowchart illustrating operations in a free game of the gaming machine of FIG. 1.

The following is an explanation of operations in the game providing state, as a method for controlling the gaming machine 1, by referring to the flowcharts illustrated in FIG. 5 and FIG. 8.

The gaming machine 1, which has received setting of the number of lines and the number of bets in the input waiting state, and then changed to the game providing state by receiving the operation of the start button, starts a normal game by controlling the upper display device 15 and the lower display device 9 by the controller 20.

The normal game proceeds in accordance with the flowchart of FIG. 5. First, in the processing at S10, the CPU 21 receives a signal of the spin button 7. Determination is repeated if a signal of the spin button 7 is not inputted, and the process proceeds to S11 if a signal of the spin button 7 is inputted. Further, the processing at S10 may proceed to S11 in response to a player's operation of the bet button as described above.

In the processing at S11, the CPU 21 starts displaying spin of the respective reels 2 in the symbol region 41 displayed in the game display 40 on the display unit 18. Subsequently, the process proceeds to S12 and the CPU 21 acquires a predetermined number of random numbers required for providing the game. The random numbers may be internally generated by the CPU 21, or may be acquired by the CPU 21 from a random number generator (not illustrated) that is installed separately in the gaming machine 1, or the random numbers may be acquired from a device such as a server set up outside the gaming machine 1.

In the next process at S13, the CPU 21 determines stop positions of the respective reels 2, based on the random numbers acquired at S12. For example, the CPU 21 is capable of using one random number for each of the reels 2 to determine a position of a virtual reel strip corresponding to the random number that is used in a predetermined table as the stop position.

Next, in the processing at S14, the CPU 21 determines whether or not the player wins a special event based on the random numbers acquired at S12. The CPU 21, for example, determines that the second condition is satisfied when a result of a lottery drawing based on the random numbers is a win. The second condition is a condition to apply a special event. When the CPU 21 determines that the player has not won the special event, the process proceeds to S15.

In the processing at S15, the CPU 21 stops the reels that are spin-displaying in the symbol region 41 based on the stop positions of the respective reels determined in the processing at S13. Subsequently, in the processing at S16, the CPU 21 determines whether or not a combination of the symbols 43 appearing in the cells 42 of the symbol region 41 form a predetermined winning pattern. When no winning pattern is formed, the operations of the normal game illustrated in FIG. 5 end. In contrast, when any winning pattern is formed, the process proceeds to S16. In the processing at S16, the CPU 21 calculates the prize amount corresponding to the formed winning pattern, and provides the player with a credit that is equivalent to the calculated prize amount. The provided credit is accumulated in the gaming machine 1, and can be used to bet in the next and succeeding slot games. When providing the credit ends, the process proceeds to S18.

In the processing at S18, the CPU 21 determines whether or not the combination of the symbols 43 appearing in the cells 42 of the symbol region 41 forms a predetermined special pattern. The predetermined special pattern is a condition (first condition) to apply a special game. When no special pattern is formed, the operations of the normal game illustrated in FIG. 5 end.

Figure 6:
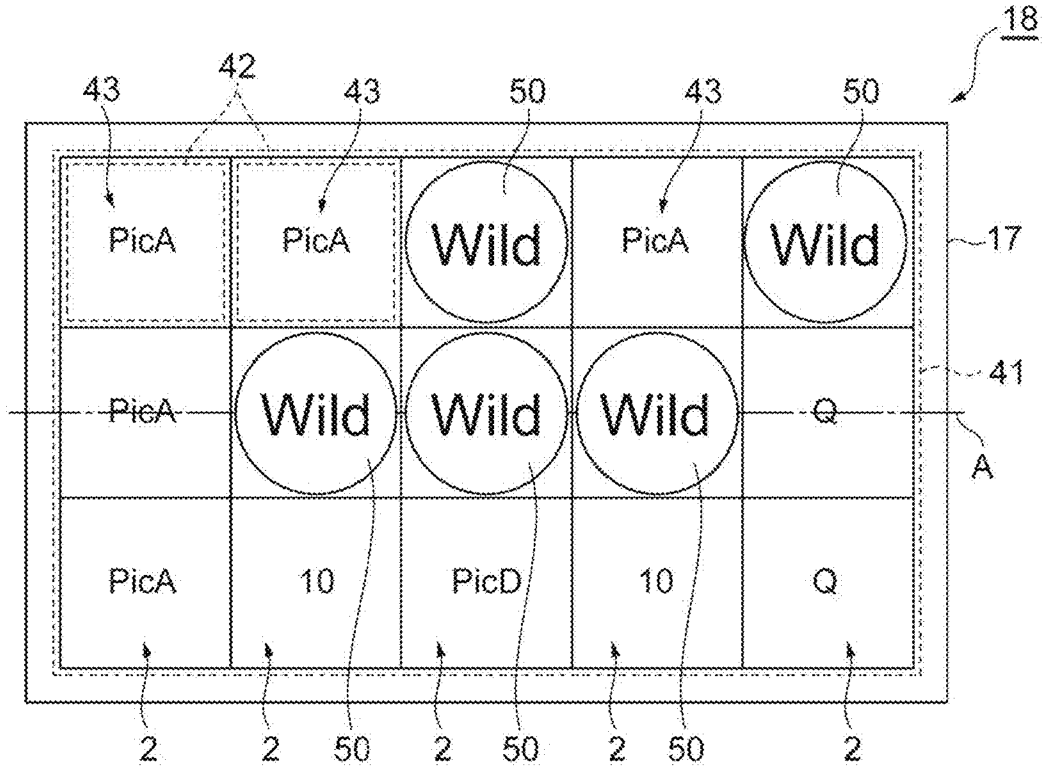
FIG. 6 illustrates an example of a display unit when a special event is applied.

In contrast, in the processing at S14, when the CPU 21 determines that the player wins a special event, the process proceeds to S40. In the processing at S40, the CPU 21 executes a special event. The special event is an event in the game that provides an advantageous situation to the player. An example of the special event includes an event to change symbols displayed in the predetermined cells 42 in the symbol region 41 to wild symbols that can be substituted for other symbols. FIG. 6 illustrates a display of an example in which a special event is applied to the symbol region 41 of the game display 40 illustrated in FIG. 3. In this example, the plurality of symbols 43 displayed in the cells 42 of FIG. 3 are changed to wild symbols 50. As illustrated in FIG. 6, a winning pattern can be easily formed by changing the symbols to wild symbols by the special event and the player is provided with an advantageous situation having a high probability of winning a high-priced prize. Application of the special event, and the positions and the number of symbols to be changed to wild symbols may be determined at random or based on predetermined rules. For example, the positions and the number of the symbols to be changed may be determined in response to display of a predetermined symbol or a predetermined combination of symbols in the symbol region 41. Further, an example shows one symbol is changed to one wild symbol in FIG. 6, but a plurality of adjacent symbols may be changed to a large wild symbol, and a win determination can be configured to perform as recognizing each of the symbol positions including a wild symbol of an ordinary size. In addition, the visual expression of the process of changing the symbols to wild symbols is not limited and any expression may be properly used, such as a form wherein a symbol is changed to a wild symbol by animation a mode form a graphic of the wild symbol is superimposed and disposed on a graphic of the symbol, and a mode form the graphic of the wild symbol is moved onto and disposed on the graphic of the symbol.

Figure 7:
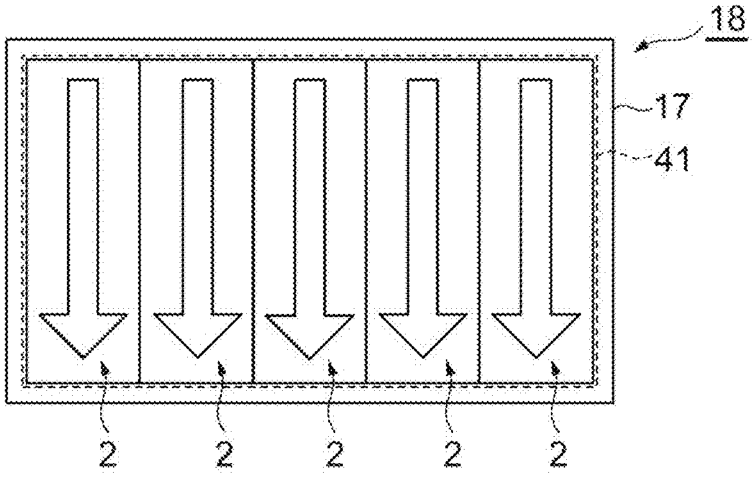
FIG. 7 illustrates an example of display transition when the special event is applied.
Figure 7:
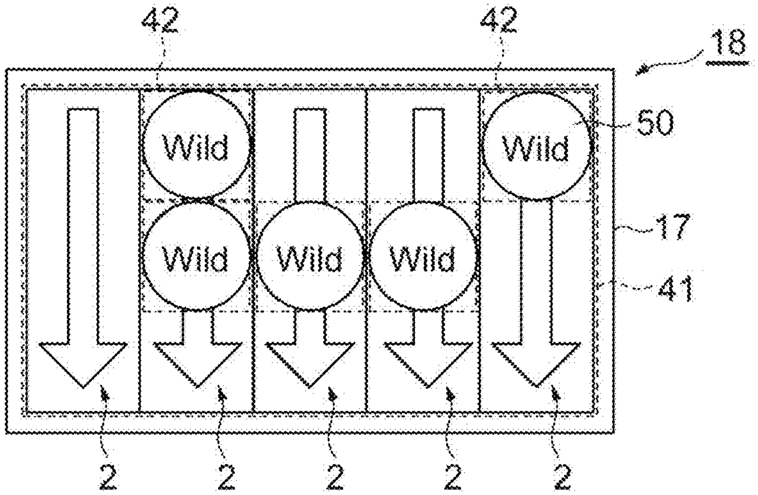
Figure 7:
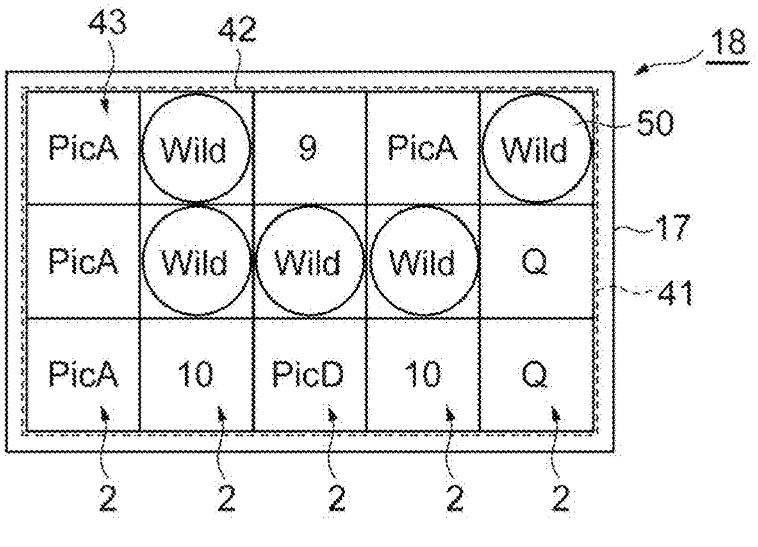

Further, in the flowchart illustrated in FIG. 5, the special event is applied before the reel spin is stopped in the symbol region 41. Transition of displays before and after the application will be explained with reference to FIG. 7 (*a*) to (*c*). First, FIG. 7 (*a*) illustrates a state where the reels 2 are spinning in the symbol region 41 before application of the special event. In this state, the symbols 43 are scrolled in each of the columns of the symbol region 41 in accordance with the arrangements of the virtual reel strips corresponding to the respective reels 2 of the symbol region 41. In FIG. 7, white arrows representing a state where the reels are spun and the symbols are scrolled. Next, FIG. 7 (*b*) illustrates a state where wild symbols 50 are arranged on the predetermined cells 42 to occupy the cells 42 during the reel spin. In this state, while the symbols 43 continue to be scrolled in each of the columns, wild symbols 50 are superimposed and displayed on the front surface of the symbols 43. In other words, in this state, the reels 2 are spun in the rear of the wild symbols 50. The last FIG. 7 (*c*) illustrates a state wherein the reel spin is stopped after application of the special event, and the symbols 43 are stopped and fixed in all of the cells 42 in the symbol region 41.

Other examples of the special event include: an event in which the reels are re-spun after a win determination while some of the symbols displayed in the symbol region 41 are held; an event in which symbols displayed in the cells 42 are promoted to symbols with a higher value (high-dividend symbols or multiplier symbols to multiply the dividend by a predetermined number); an event in which a multiplier is applied to provide a multiple to the prize amount corresponding to a formed winning pattern; an event in which the multiple of the multiplier is increased; an event in which the determination line or the symbol region 41 is expanded to increase the number of subjected symbols for a win determination; and an event in which low valued symbols are replaced with high valued symbols. The special event may be an event to change the virtual reels forming the reels to a configuration advantageous to the player, and an event to add a special reel including symbols advantageous to the player. In any case, no limitations exist for the application, the contents, and the visual expression of the special event, as described above. When the processing at S40 is finished, the processing of S15 and subsequent processing proceed in the same manner as described above.

In contrast, in the processing at S18, when the CPU 21 determines that the player wins a special game, the process proceeds to S42. In the processing at S42, the CPU 21 executes a special game. The special game is a free game that consumes no credit; a game in a mode with a prize-winning rate or a dividend rate that is set higher than that in the normal game; a game different from a slot game such as a pick game; or a slot game adopting reels and rules different from those of the normal game. The present embodiment illustrates the case of providing free games as the special games, and operations thereof will be explained hereafter.

The free games proceed in accordance with the flowchart of FIG. 8. First, at S70, the CPU 21 determines a number m of free games. For example, the CPU 21 acquires a random number, and determines the number m of free games using the acquired random number. Here, the number of free games defines the number of free games, on the assumption that one game ranges from a start of a reel spin to stop of the reel spin and determination as to whether any winning pattern is formed (in the case where any winning pattern is formed, further to provision of credit). The CPU 21 may automatically execute a plurality of free games without waiting for a player's input, or may wait for a player's operation after one free game is finished and start the next free game. The number m of free games may be determined in accordance with a combination of the symbols 43 determined to be formed in the cells 42 of the symbol region 41 in the processing at S18. After the determination, the process proceeds to S71.

The CPU 21 acquires a random number in the processing at S71. Subsequently in the processing at S72, the CPU 21 determines applying a special event during execution of the p-th ($1 \leq p \leq m$) free game based on the random number acquired in the processing at S71. After the determination, the process proceeds to S73, and the CPU 21 sets the number q of the remaining games to "q=m". After the setting, the process proceeds to S74.

The processing from S74 to S81 corresponds to the processing from S12 to S17 in the operations of the normal game as illustrated in FIG. 5. At S76, the stop positions of the respective reels 2 are determined based on the random numbers acquired at S74. After the determination, the process proceeds to S77.

In the processing at S77, the CPU 21 determines whether or not the condition "m−q+1=p" is satisfied. That is to say, the CPU 21 determines whether or not the current free game is the p-th free game to which the special event is applied. In the processing at S77, when the CPU 21 determines that the condition "m−q+1=p" is satisfied, because the current free game is the p-th free game, the special event is to be applied to the p-th free game, the process proceeds to S90, and special event processing is performed. On the other hand, when the condition "m−q+1=p" is not satisfied, because the current free game is not the p-th free game, the process proceeds to S78.

In the processing at S78, the CPU 21 further determines whether the player wins a special event, based on the random number. When the player wins a special event, the process proceeds to S90, and the CPU 21 executes special event processing. That is to say, there are cases where a special event is stochastically applied, even when the current free game is not the p-th free game. In addition, after the special event is applied, the process proceeds to S79, and the CPU 21 stops the spin of the reels 2. In the processing at S78, when the player does not win a special event, the process proceeds to S79 without any processing, and the CPU 21 stops the spin of the reels 2 without applying a special event. Thereafter, the process proceeds to S80, and the CPU 21 performs a win determination. When a win is acquired, the process proceeds to S81, and the CPU 21 provides the player with a credit that is equivalent to the prize money amount. When no win is acquired in the processing at S80, or when providing the credit is finished in the processing at S81, the process proceeds to S82.

In the processing at S82, the CPU 21 sets "q−1" for the number q of the remaining games. Thereafter, the process proceeds to S83, and the CPU 21 determines whether or not the number q of the remaining games is zero. When the number q of the remaining games is not zero, the process proceeds to S74. That is to say, the processing from S74 to S83 is performed repeatedly until the number q of the remaining games becomes zero. When the number q of the remaining games is zero, because that means m-th free games are finished, the operations of the free game illustrated in FIG. 8 end.

However, the function of the controller 20 described above is not limited to the gaming machine, so may be achieved by a program executed by various types of computers such as a personal computer, a server computer, a smartphone, a tablet terminal, and a PDA. The function may also be achieved by execution of a program by distributed processing performed by a system such that a gaming machine and various computers are connected to perform communications, or a system formed by various computers that are connected to perform communications.

Specifically, a program can be created to cause one or a plurality of computers to function in the same manner as the controller 20 described above. The function achieved by executing such a program is the same as that of the controller 20 described above, and the like, a function to apply a special event at least once during execution of free games is achieved.

The above program may be recorded and provided in a computer-readable recording medium, such as a random access memory (RAM), a read-only memory (ROM), an erasable programmable read-only memory (EPROM), a flash memory, a hard disk drive, a solid state drive, a floppy (registered trademark) disk, a flash drive, a compact disc, and a digital video disk.

With the gaming machine, the gaming method, and the recording medium according to the embodiment described above, a special event is applied at least once in a predetermined number of free games, irrespective of whether or not the second condition to apply the special event is satisfied. Therefore, the gaming machine prevents the player from feeling that an opportunity to acquire a large-amount dividend was lost. Accordingly, the gaming machine suppresses reductions in player satisfaction.

In addition, with the gaming machine, the gaming method, and the recording medium according to the embodiment, the p-th free game that applies a special event is determined by using a random number, therefore, the timing to apply the special event is not uniform in comparison with the case of setting p as a fixed value in advance. For this reason, the gaming machine can apply a special event at a timing that is unexpected to the player when free games are being executed. Accordingly, the gaming machine is able to provide the player with an unexpected game development, and prevents the player from getting used to and becoming tired of the proceedings of the game.

The present invention is not limited to the embodiment described above, but can be carried out in proper forms. For example, arrangement of the cells forming the symbol region and the number of reels arranged in the symbol region are not limited to the example of the embodiment described above. The embodiment described above illustrates all the reels as virtual reels, but some of or all the reels may be physical reels. Additionally, the embodiment described above illustrates the example in which a special event is coercively applied only once during a predetermined number of free games, but a special event may be coercively applied a plurality of times. For example, the CPU may set p-th, t-th, and u-th free games as free games to which the special event is applied, so that execution of the special event can be executed a plurality of times. Additionally, when a pick game is adopted as the special game, an operation may be performed to apply a special event (such as a high dividend bonus) to the p-th game, in the same manner as the free games. In addition, the game machine according to the embodiment is illustrated with the example such that the stop positions of the individual symbols are determined based on random numbers, but the combination may be determined by internal lottery drawing, and the stop positions may be set in accordance with the combination.

In addition, the embodiment described above illustrates the case in which the special event is applied before the reels are stopped, but the special event may be applied after the reels are stopped. Additionally, the contents of the special event may be properly changed by lottery drawing. Moreover, the special event is not limited to an event for changing a result of the normal game, but may be a bonus game such as a pick game, a roulette game, and a wheel game, or another slot game.

Furthermore, the aspect of the free games serving as special games is not limited to the embodiment described above, but may have the structure of changing the prize-winning rate or the dividend rate by changing the type and the number of the symbols included in the reels, the number of the reels, or the rules during execution of the free games, or the method for stopping and controlling the reels may be changed during execution of the free games.

The embodiment described above has the structure in which the free game to apply the special event is determined based on a random number, but the free game to which the special event is applied may be determined in advance. For example, the special event may be applied to the first or the last free game regardless of the number of the free games. The structure of applying the special event in the first free game causes the first free game to function as a tutorial to explain the contents of the special event, and then enhances player's expectations for the subsequent free games to be provided. The structure of applying the special event in the last free game provides a chance for a large-amount dividend in the last free game, and enhances satisfaction that the player feels after the free games are finished. However, in this case, although it is able to apply the special event at least once in a predetermined number of free games, the special event cannot be applied at a timing that is unexpected to the player. The free game to which the special event is applied is not limited to the first game or the last game. It can be also determined in advance to which game the special event is to be applied, in accordance with the number of provisions of free games.

Furthermore, in the case where the structure in which additional free games can be acquired during free games, the additional free games can also be processed in the same manner as the above, such that at least one special event may be applied during the additional free games of a predetermined number. As a matter of course, such mode is not imperative, but the mode may be adopted to apply the special event at least once in a series of free games, regardless of presence/absence of additional free games.

Furthermore, when no prize winning occurs even when a special event is applied, or when an award such as a dividend to be provided is small even when the player wins a prize, in the normal game and/or the special game to which the special event is applied, processing to omit the special event may be added. Adding such processing removes a phenomenon in which no prize winning occurs even when a special event is applied, and enables the structure in which application of a special event secures prize winning or a predetermined award. Further, adding such processing is not contrary to the gist of the present invention, but the technical scope of the present invention also includes the structure obtained by adding the processing to the embodiment described above.

REFERENCE SIGNS LIST

1 . . . Gaming machine, 2 . . . Reel, 18 . . . Display unit (display unit), 20 . . . Controller.

What is claimed is:

1. A gaming machine providing a player with a game, comprising:

a display unit configured to display the game;

a plurality of reels displayed on the display unit, each reel including a plurality of symbols; and a controller configured to determine contents of the game to be displayed on the display unit, wherein the controller is configured to execute a predetermined number of special games when a first condition is satisfied during execution of a normal game, wherein the first condition comprises a display of a special pattern of the plurality of symbols on the plurality of reels, and wherein the predetermined number of free games is determined by selection of a random number, apply a special event when a second condition is satisfied during execution of the normal game or execution of the special games, and apply the special event at least once during execution of the predetermined number of the special games regardless of the second condition and regardless of the predetermined number of free games.

2. The gaming machine according to claim 1, wherein the controller determines at least one special game among the predetermined number of the special games by lottery drawing when the first condition is satisfied, and the special event is applied to the at least one special game.

3. The gaming machine according to claim 2, wherein the controller starts providing the predetermined number of special games after determining the at least one special game, and the special event is applied to the at least one special game.

4. The gaming machine according to claim 2, wherein the controller provides the normal game and the special games, the controller determines acquisition of a win when predetermined symbols are arranged in an effective line in the normal game and the special games, and the special event is an event to change at least one symbol in the plurality of reels to a wild symbol.

5. The gaming machine according to claim 2, wherein the controller provides the normal game and the special games, the controller determines acquisition of a win when a predetermined number of specific symbols exist in a determination region in the normal game and the special games, and the special event is an event to change at least one symbol in the plurality of reels to the specific symbol.

6. The gaming machine according to claim 2, wherein the controller provides the normal game and the special games, a dividend is provided when the controller determines acquisition of a win in the normal game and the special games, and the special event is an event to change at least one symbol in the plurality of reels to a high-dividend symbol.

7. The gaming machine according to claim 2, wherein the controller provides the normal game and the special games, a dividend is provided when the controller determines acquisition of a win in the normal game and the special games, and the special event is an event to change at least one symbol in the plurality of reels to a multiplier symbol to multiply the dividend by a predetermined number.

8. The gaming machine according to claim 2, wherein at least either one of a prize-winning rate or a dividend rate in the special games is higher than that of the normal game.

9. The gaming machine according to claim 2, wherein the special games are free games that are provided without credit consumption.

10. The gaming machine according to claim 1, wherein the controller provides the normal game and the special games, the controller determines acquisition of a win when predetermined symbols are arranged in an effective line in the normal game and the special games, and the special event is an event to change at least one symbol in the plurality of reels to a wild symbol.

11. The gaming machine according to claim 1, wherein the controller provides the normal game and the special games, the controller determines acquisition of a win when a predetermined number of specific symbols exist in a determination region in the normal game and the special games, and the special event is an event to change at least one symbol in the plurality of reels to the specific symbol.

12. The gaming machine according to claim 1, wherein the controller provides the normal game and the special games, a dividend is provided when the controller determines acquisition of a win in the normal game and the special games, and the special event is an event to change at least one symbol in the plurality of reels to a high-dividend symbol.

13. The gaming machine according to claim 1, wherein the controller provides the normal game and the special games, a dividend is provided when the controller determines acquisition of a win in the normal game and the special games, and the special event is an event to change at least one symbol in the plurality of reels to a multiplier symbol to multiply the dividend by a predetermined number.

14. The gaming machine according to claim 1, wherein at least either one of a prize-winning rate or a dividend rate in the special games is higher than that of the normal game.

15. The gaming machine according to claim 1, wherein the special games are free games that are provided without credit consumption.

16. A gaming method for displaying a game provided to a player by a display unit displaying a plurality of reels, each reel including a plurality of symbols, and determining contents of the game to be displayed on the display unit by a controller, the method comprising a step of:

executing a predetermined number of the special games when a first condition is satisfied during execution of a normal game, wherein the first condition comprises a display of a special pattern of the plurality of symbols on the plurality of reels, and wherein the predetermined number of free games is determined by selection of a random number;

applying a special event when a second condition is satisfied during execution of the normal game or execution of the special games; and applying the special event at least once during execution of the predetermined number of the special games regardless of the second condition and regardless of the predetermined number of free games, by the controller.

17. A non-transitory computer-readable recording medium recording a program to cause one or a plurality of computers to implement a function of providing a player with a game, the program causing the one or plurality of computers to function as a controller determining contents of the game to be displayed on a display unit displaying a plurality of reels, each reel including a plurality of symbols, wherein the controller is configured to execute a predetermined number of special games when a first condition is satisfied during execution of a normal game, wherein the first condition comprises a display of a special pattern of the plurality of symbols on the plurality of reels, and wherein the predetermined number of free games is determined by selection of a random number, apply a special event when a second condition is satisfied during execution of the normal game or execution of the special games, and apply the special event at least once during execution of the predetermined number of the special games regardless of the second condition and regardless of the predetermined number of free games.

* * * * *